E. A. SAGUI.
LATHE TOOL HOLDER.
APPLICATION FILED MAR. 9, 1918.

1,279,917.

Patented Sept. 24, 1918.

INVENTOR
Edward A. Sagui
BY
Dyke & Caufield
ATTORNEYS

UNITED STATES PATENT OFFICE.

EDWARD A. SAGUI, OF NEWARK, NEW JERSEY.

LATHE TOOL-HOLDER.

1,279,917. Specification of Letters Patent. Patented Sept. 24, 1918.

Application filed March 9, 1918. Serial No. 221,346.

*To all whom it may concern:*

Be it known that I, EDWARD A. SAGUI, a citizen of the United States, and a resident of Newark, county of Essex, and State of New Jersey, have invented certain new and useful Improvements in Lathe Tool-Holders, of which the following is a specification.

My invention relates to tool holders for lathes. The object of the invention is to provide a holder for lathe tools or cutters which enables the use of cutters of small size, thereby saving much expensive steel, such as high speed steel or the like; which may be used either for right or left hand cutting, and is also adapted for boring or the like operations.

With the foregoing and related objects in view, my invention consists in the parts, constructions, elements and combinations herein set forth and claimed.

Figure 1:
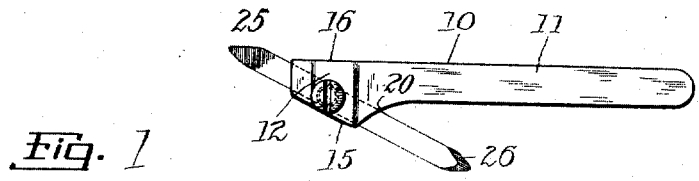
Figure 2:
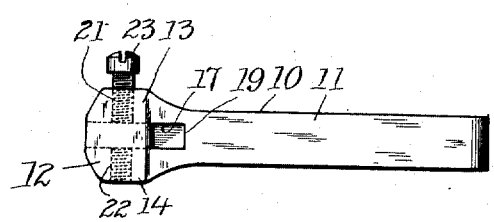
Figure 3:
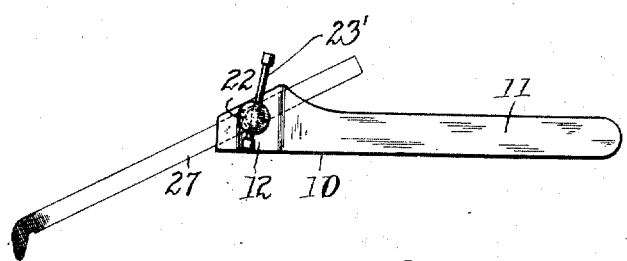
Figure 4:
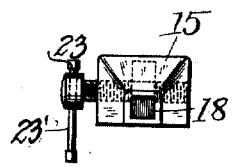

Figure 1 of the accompanying drawing, forming part of this specification, is a plan view of my improved holder with a cutting tool in place therein arranged for right hand cutting. Fig. 2 is a side view of the holder. Fig. 3 is a plan view of the holder turned over for left hand cutting and with a boring tool in place therein. Fig. 4 is an end view of the holder.

The holder is designated by the reference numeral 10 and comprises a shank 11 preferably straight and of the form usually given to the shanks of lathe tools, and is adapted to be held in a lathe chuck or lathe tool holder in the same way that the shanks of ordinary lathe tools are customarily held, the holder taking the place of a large portion of the ordinary lathe tool. The holder has a head 12 which is preferably formed by providing an upward extension 13 and a downward extension 14 and a lateral extension 15 to the shank 11, the remaining side 16 of the head 12 being preferably substantially in line with that side of the shank 11, and the side 15 preferably making an acute angle with the opposite face 16 substantially as shown, though there may be, of course, more or less variation in this respect. An opening 17 for receiving a cutting tool is formed in the head 12 and extends outwardly through the end thereof, as shown in Fig. 4, at 18, and its opposite end 19 being formed in the shoulder 20 produced by the lateral extension 15 of the head 12 beyond the shank 11, this opening 19 being preferably substantially parallel to the face 15, and like such face, making a substantially acute angle with the opposite preferably flat face 16, though in this respect too there may be considerable variations from the particular structure shown. The hole 17 is preferably made square and may be formed in any suitable way, as by broaching or the like operations. The outer end 18 of the hole 17 is preferably in substantial alinement with the longitudinal axis of the shank 11. Tapped holes 21, 22 are formed in the portions 13 and 14 of the head, respectively, and are adapted to receive a holding screw 23 for clamping the cutters in place on the holder. One form of cutter is shown in Fig. 1, and has cutting faces or portions 25 and 26 at its opposite ends, one of such cutting faces being preferably directed upwardly and another downwardly, as shown in said Fig. 1. It will be apparent that by turning the holder 10 over and reversing the ends of the cutting tool 24, the device of Fig. 1 can be used for left hand cutting without further change. Cutters of various sizes may, of course, be used, and the size of the holder and of the opening 17 therein may, of course, be varied to correspond to the size of cutter used and to the type of work to be done. If desired, the head of the screw 23 may be provided with a bore to receive a slidable lever 23' similar to that used in vises.

In Fig. 3 the holder 10 is shown provided with a boring cutter 27 with which it may be used for boring and the like operations, the holder 10 being chucked in the lathe by its shank 11 in the same way that the shank of an ordinary boring tool may be held. The end 18 of the cutter hole 17 being substantially in line with the axis of the shank 11, boring work in holes of small diameter can be effectively carried out, or larger diameter boring work as with the boring tool 27 arranged as shown in Fig. 3.

It will be seen that by the use of a holder in accordance with my invention, considerable economies and facilities in operation may be effected. Double ended cutters may be held substantially by their middle portions, and it becomes possible not only to effect considerable saving in the use of steel adapted for cutters by making them of small size, but also they may be sharpened and used for cutting at both ends. The device is readily reversible for right or left hand cutting and is also adapted to be used for a- rate boring work, and is adapted for use with various forms of machine tools as shapers, planers, turret lathes, etc.

I claim:

In a lathe tool holder, a shank, a head having substantially identical top and bottom faces and having a third face substantially flush with a side of the shank and a fourth face projecting laterally and forming a shoulder with said shank, and an opening for cutting tools extending substantially parallel to the top and bottom faces and having one end in the end of the head opposite the shank and the other end in the shoulder between the head and shank, a screw-threaded opening extending from the top and bottom faces to said opening, and screw means for clamping a tool in said opening whereby the holder can be turned over and used for right and left hand cutting.

In testimony that I claim the foregoing, I have hereto set my hand, this 6th day of March, 1918.

EDWARD A. SAGUI.

Copies of this patent may be obtained for five cents each, by addressing the "Commissioner of Patents, Washington, D. C."